United States Patent [19]

Ross

[11] Patent Number: 5,977,884
[45] Date of Patent: Nov. 2, 1999

[54] RADAR DETECTOR RESPONSIVE TO VEHICLE SPEED

[75] Inventor: Monte Ross, St. Louis, Mo.

[73] Assignee: Ultradata Systems, Inc., St. Louis, Mo.

[21] Appl. No.: 09/108,675

[22] Filed: Jul. 1, 1998

[51] Int. Cl.[6] .................................................. G08G 1/01
[52] U.S. Cl. .......................... 340/936; 340/904; 340/991;
340/992; 340/993; 340/995; 342/357
[58] Field of Search .................................. 340/936, 937,
340/980, 991, 992, 993, 901, 902, 904,
905, 995; 342/357, 179

[56] References Cited

U.S. PATENT DOCUMENTS

| | | | |
|---|---|---|---|
| 3,922,660 | 11/1975 | Galvin | 340/258 A |
| 4,903,212 | 2/1990 | Yokouchi et al. | 364/449 |
| 4,906,999 | 3/1990 | Harrah et al. | 342/20 |
| 5,111,210 | 5/1992 | Morse | 342/455 |
| 5,202,692 | 4/1993 | Huguenin et al. | 342/179 |
| 5,289,188 | 2/1994 | Chudleigh, Jr. | 342/58 |
| 5,347,285 | 9/1994 | MacDoran et al. | 342/357 |
| 5,424,957 | 6/1995 | Kerkhoff et al. | 364/479 |
| 5,432,520 | 7/1995 | Schneider et al. | 342/357 |
| 5,461,365 | 10/1995 | Schlager et al. | 340/573 |
| 5,485,161 | 1/1996 | Vaughn | 342/357 |
| 5,504,482 | 4/1996 | Schreder | 340/995 |
| 5,510,793 | 4/1996 | Gregg, III et al. | 342/20 |
| 5,515,042 | 5/1996 | Nelson | 340/937 |
| 5,570,087 | 10/1996 | Lemelson | 340/870.05 |
| 5,572,201 | 11/1996 | Graham et al. | 340/902 |
| 5,574,469 | 11/1996 | Hsu | 342/455 |
| 5,606,506 | 2/1997 | Kyrtsos | 364/449 |
| 5,619,211 | 4/1997 | Horkin et al. | 342/357 |
| 5,650,770 | 7/1997 | Schlager et al. | 340/573 |
| 5,659,290 | 8/1997 | Haeri | 340/441 |
| 5,663,732 | 9/1997 | Stangeland et al. | 342/357 |
| 5,666,111 | 9/1997 | Servat et al. | 340/980 |
| 5,684,476 | 11/1997 | Anderson | 340/988 |
| 5,686,925 | 11/1997 | Maeda et al. | 342/357 |
| 5,714,948 | 2/1998 | Farmakis et al. | 340/961 |
| 5,761,630 | 6/1998 | Sekine et al. | 701/301 |

*Primary Examiner*—Edward Lefkowitz
*Assistant Examiner*—Davetta Woods
*Attorney, Agent, or Firm*—Senniger, Powers, Leavitt & Roedel

[57] ABSTRACT

A radar detecting circuit adapted to be on the vehicle detects a radar signal and selectively provides a radar detect signal in response to detecting the radar signal. The vehicle's speed is determined such as indicated by a tachometer signal or a global positioning system (GPS) receiver adapted to be on the vehicle and providing a GPS speed signal representative of the vehicle speed. An alarm responsive to both the radar detect signal and the GPS speed signal provides an alarm indication when a radar signal is detected and the vehicle speed is above a preset maximum, such as the speed limit. The operator indicates the present maximum speed via an input device such as a keypad or via voice recognition software.

22 Claims, 2 Drawing Sheets

RADAR DETECTOR RESPONSIVE TO VEHICLE SPEED

BACKGROUND OF THE INVENTION

The invention generally relates to an apparatus which is used with a moving vehicle to provide an alarm when a radar signal impinges on the vehicle. In particular, the invention relates to such an apparatus in which the alarm is responsive to both radar signals impinging on the vehicle and a signal representative of the speed of the vehicle.

Radar detectors are well known in the prior art. In general, such detectors generally provide an alarm indication when a radar signal is received. Recent developments in radar detectors have focused on the sensitivity of the detectors and the various bandwidths within which radar signals are detected. However, there is a continuing need to improve the accuracy of alarms provided by radar detectors.

Some recent developments have suggested using a radar detector in combination with a speed measuring device and printer for verifying vehicle speed. For example, U.S. Pat. No. 5,510,793, incorporated herein by reference, discloses such a system which enables the user to verify the speed of the vehicle responsive to sensing that a radar device has been used to measure the speed. Other developments, such as U.S. Pat. No. 5,485,161, incorporated herein by reference, disclose a vehicle speed control based on GPS/MAP matching of posted speed limits. This system actually limits the vehicle speed based on its position.

None of these developments address a common problem with many radar detectors, i.e., false alarms. In general, detectors tend to indicate false alarms in response to signals which appear to be but are not radar signals. In addition, radar detectors tend to provide alarms whenever a radar signal is received, even in situations where the vehicle is at rest and no alarm is really necessary. Therefore, there is a need for an apparatus including a radar detector which minimizes false alarms and only provides alarms when necessary.

SUMMARY OF THE INVENTION

It is an object of the invention to provide an apparatus for alerting vehicle operators of radar signals only when the vehicle is being operated above a preset speed above the speed limit specified for the road on which the vehicle is being operated.

It is another object of the invention to provide a radar detector which cooperates with a vehicle speed signal such as provided by a global positioning system to provide a radar alarm in response to both a detected radar signal and additionally in response to the speed signal of the vehicle.

It is another object of the invention to provide a global positioning system apparatus which may be used in combination with a radar detector for selectively providing radar alarms only when the vehicle speed is greater than a preset maximum speed indicated by the operator.

It is another object of the invention to provide a radar detector in combination with a global positioning system which can be manufactured by modifying and retrofitting existing radar detectors with a global positioning system receiver.

In one form, the invention comprises apparatus for use on a vehicle. A radar detecting circuit adapted to be on the vehicle detects a radar signal and selectively provides a radar detect signal in response to detecting the radar signal. A global positioning system (GPS) receiver adapted to be on the vehicle determines a speed of the vehicle and provides a GPS speed signal representative of the vehicle speed. An alarm responsive to both the radar detect signal and the GPS speed signal provides an alarm indication.

In another form, the invention comprises an apparatus for use on a vehicle and for use with a speed signal representative of the speed of the vehicle. A radar detector adapted to be on the vehicle detects a radar signal and selectively provides a radar detect signal in response to detecting the radar signal. An alarm provides an alarm indication when energized. A circuit connected to the alarm and receiving the radar detect signal and the speed signal, selectively energizes the alarm in response to both the radar detect signal and the speed signal.

In another form, the invention comprises an apparatus for providing an alarm indication for a vehicle. A detector detects a radar signal impinging on the vehicle. An input device responsive to operator input defines a maximum acceptable speed of the vehicle. A speed circuit determines an actual speed of the vehicle. An actuating circuit selectively energizes an alarm to provide the alarm indication when a radar signal is detected by the detector and the speed circuit determines that the actual speed of the vehicle equals or exceeds the maximum acceptable speed of the vehicle as defined by the input device.

The invention also comprises a method of providing an alarm indication for a vehicle comprising the steps of:

detecting a radar signal impinging on the vehicle;

defining a maximum acceptable speed of the vehicle;

determining an actual speed of the vehicle; and actuating an alarm to provide the alarm indication when a radar signal is detected and the determined actual speed of the vehicle equals or exceeds the maximum acceptable speed of the vehicle.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

Figure 1:
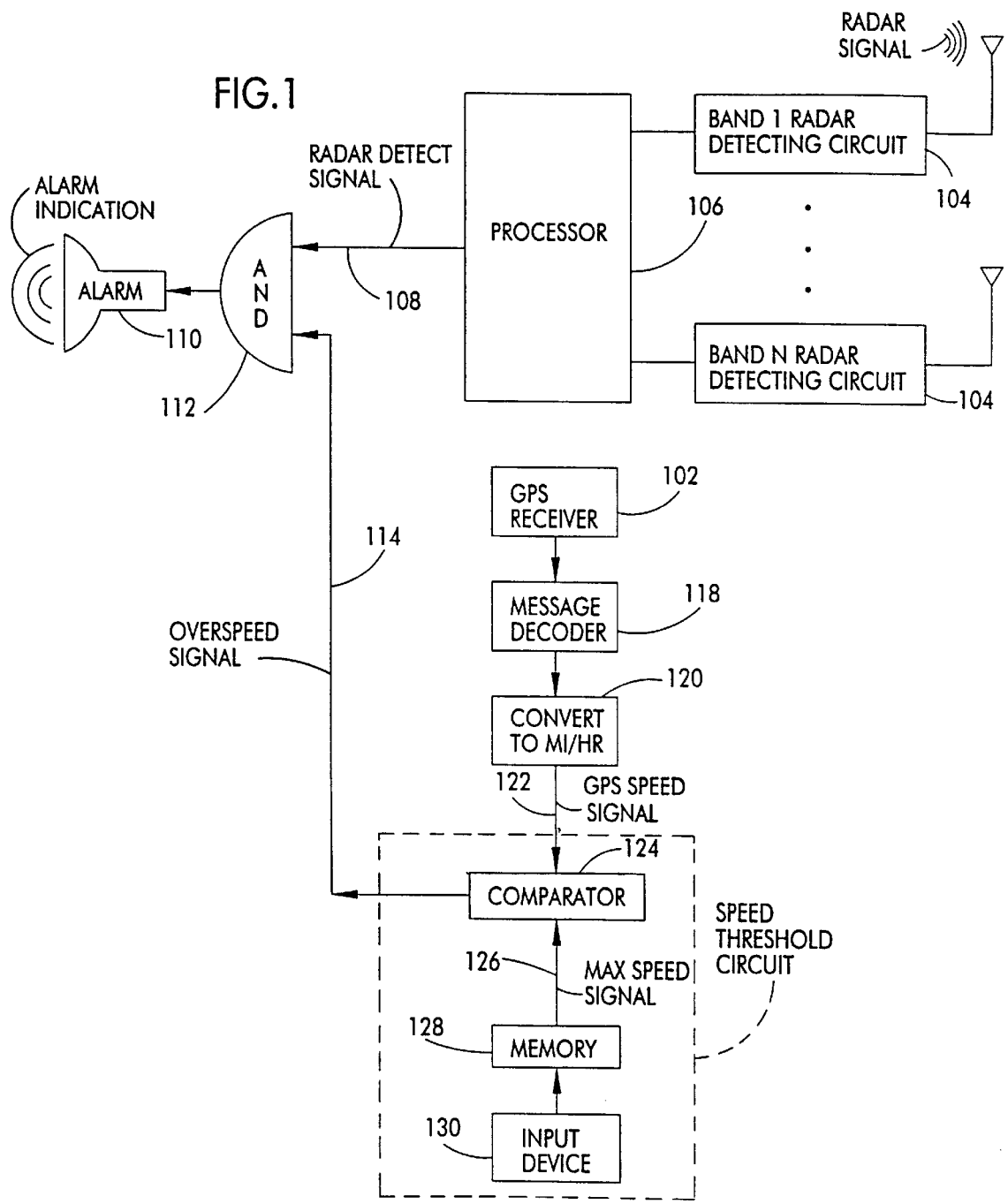
FIG. 1 is a block diagram of one preferred embodiment of the apparatus according to the invention in which an AND gate drives an alarm in response to a radar detector and a GPS receiver.

FIG. 1 is a block diagram of one preferred embodiment of the apparatus according to the invention. In this embodiment, it is contemplated that a standard automobile radar detector would be modified and retrofitted to work in combination with a global positioning system (GPS) receiver 102 and other associated hardware and software. In general, a standard automobile radar detector is generally illustrated by the upper portion of FIG. 1. Such detectors usually include one or more band detecting circuits 104 which include various antennas and/or circuits for detecting various bandwidths such as X band, K band, KA band or laser band radar devices. Although these circuits are separately illustrated, they may share components or be constructed as multiband circuits. The outputs of these radar detecting circuits 104 are provided to a processor 106 which generally processes the output signals to determine whether or not an alarm indication should be activated. For example, processor 106 may compare the output of each band to a particular threshold level and only indicate or actuate an alarm in the event that a particular output is above that level. Furthermore, some radar detectors have redundant radar detecting circuits 104 and will only operate when both radar detecting circuits for the same band indicate receiving a signal greater than a threshold level.

In the event that the processor 106 receives signal which warrants energization of an alarm, the processor 106 generates a radar detect signal via line 108 which is normally directly provided to an alarm 110 to energize the alarm and provide a radar indication. Alarms 110 may be audible or visual or other types of alarms which would indicate to a driver of the vehicle that a radar signal has been received. An audible alarm such as a beeper would provide a sound as an alarm indication whereas a visual alarm, such as a flashing LED, would provide light as an alarm indication.

According to one preferred embodiment of the invention, an AND gate 112 is positioned between the processor 106 and the alarm 110 and would have two inputs, one of which receives the radar detect signal via line 108. As a result of the positioning of AND gate 112, alarm 110 would not be activated to provide an alarm indication unless both inputs of AND gate 112 receive signals. According to the invention and as described in more detail below, the second or lower input of AND gate 112 receives an overspeed signal via line 114 which is generated by additional hardware and software according to the invention which is added to the standard radar detector.

In particular, the added hardware includes GPS receiver 102 which complies with NMEA 0183 which is the standard for interfacing marine electronic devices. Such receivers generally have a VTG output which provides "course over ground and ground speed" information. In particular, the VTG output indicates the actual course and speed relative to the ground of the GPS receiver 102. The VTG signal is provided to a standard message decoder 118 which decodes the signal to determine the speed of the GPS receiver and hence the speed of the vehicle on which the receiver is mounted. This speed may be indicated in knots or kilometers per hour. In either case, the speed signal is then provided to a logic converter 120 which converts the speed signal into a miles per hour signal. The converter 120 is unnecessary for a system which is operating in kilometers per hour only.

As a result, a GPS speed signal is provided via line 122 indicating the speed of the vehicle. The GPS speed signal is provided to a comparator 124 which compares the GPS speed signal via line 122 to a maximum speed signal provided via line 126. The comparator 124 along with a memory 128 and an input device 130 constitute a speed threshold circuit responsive to operator input for indicating a maximum acceptable vehicle speed. The speed threshold circuit is associated with the GPS receiver 102 by receiving the GPS speed signal via line 122.

The speed threshold circuit includes an input device 130 such as a keypad, mouse, track ball or voice actuated module which allows the driver or other operator of the apparatus of the invention to indicate a maximum desired speed. It is also contemplated that the input device could be a receiver which communicates with a transmitter indicating the speed limit of the road on which the vehicle is located. For example, the GPS or a transmitter along the roadway could broadcast a signal indicating the maximum desired speed.

Generally, the maximum desired speed would be the speed limit of the road on which the vehicle is being operated. However, the operator may choose to indicate a maximum speed which is greater than or less than the speed limit. This maximum speed essentially is the speed above which the radar detector alarm will be permitted to operate, as will be described below in further detail. The maximum speed as input by the operator via input device 130 is stored in memory 128 and provided to comparator 124 as a maximum speed signal via line 126. The comparator compares the maximum speed signal to the GPS speed signal provided by the converter 120 via line 122. In other words, the comparator is determining whether or not the actual speed of the vehicle is greater than, less than or equal to the maximum speed as set by the operator. If, and only if, the actual speed of the vehicle as indicated by the GPS speed signal is equal to or greater than the maximum speed as indicated by the operator, comparator 124 provides an overspeed signal via line 114 to AND gate 112. This overspeed signal is continuously provided to the AND gate 112 as long as the actual speed of the vehicle as indicated by the GPS speed signal is greater than or equal to the maximum speed as indicated by the operator. Essentially, this lower input of AND gate 112 functions as an enable input. In other words, the overspeed signal enables the alarm 110 or provides an input to AND gate 112 so that whenever a radar detect signal generated by processor 106 is provided via line 108, alarm 110 would be actuated or energized to provide an alarm indication. If the vehicle speed is less than the maximum speed, AND gate 112 is disabled and will not actuate alarm 110 even when a radar detect signal is provided via line 108.

Figure 2:
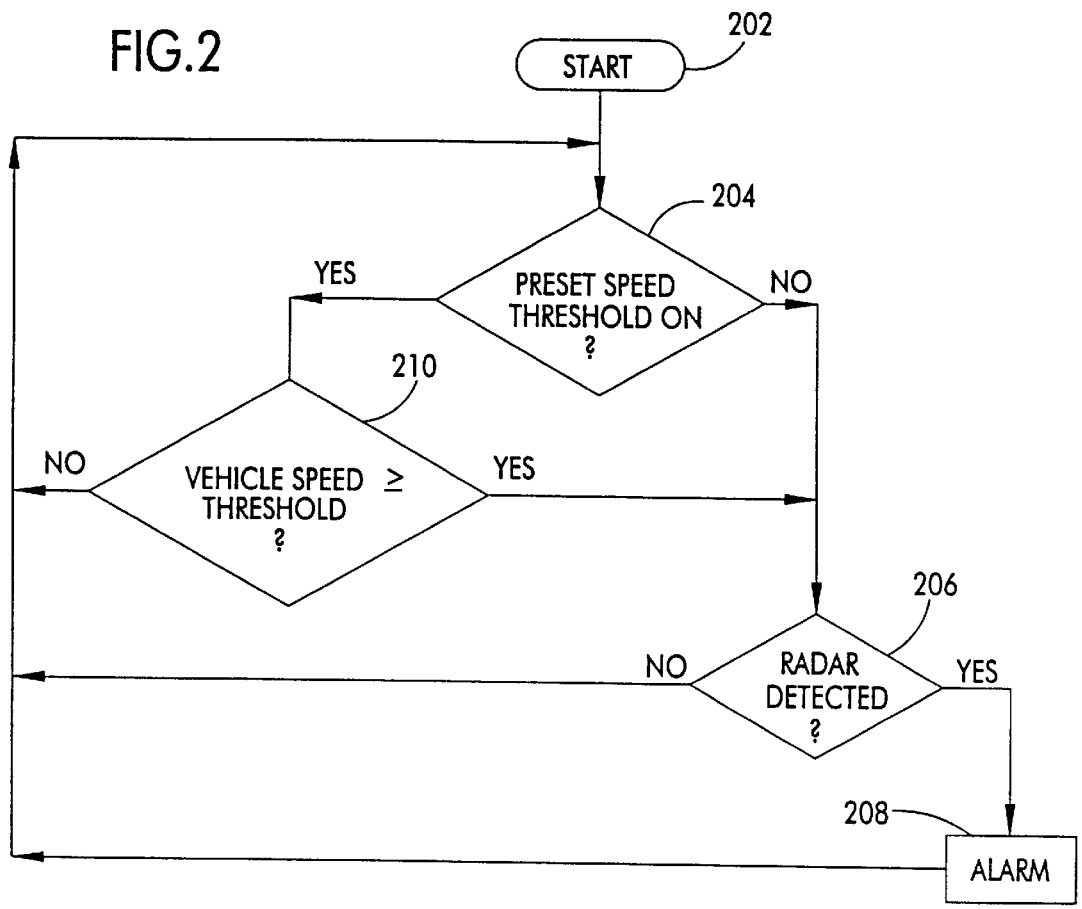
FIG. 2 is a flow chart illustrating the logical operation of one preferred embodiment of the apparatus according to the invention.
Figure 3:
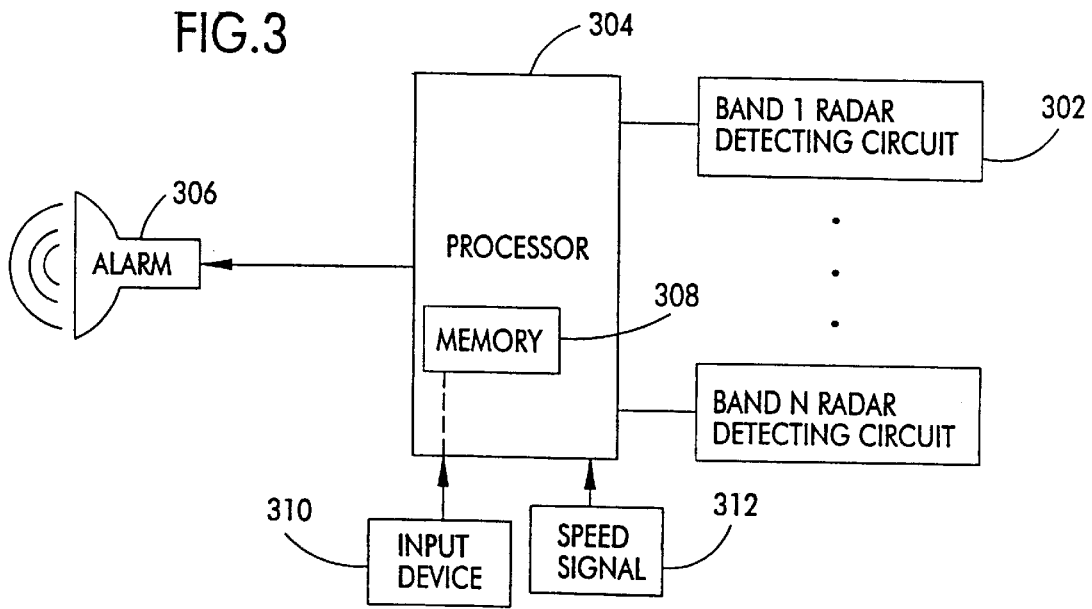
FIG. 3 is a block diagram of another preferred embodiment of the apparatus according to the invention in which a processor drives an alarm in response to a radar detecting circuit and a GPS receiver.

FIG. 2 illustrates in flow chart form a logical diagram of one preferred embodiment of the operation of the apparatus according to the invention. The logic of FIG. 2 can be implemented in hardware or software or a combination of both. For example, the logic may be implemented by logic circuitry according to the embodiment as illustrated in FIG. 1 or may be implemented by software according to the embodiment as illustrated in FIG. 3 discussed below. After being energized at step 202 by the operator, the apparatus first determines whether or not a preset speed threshold has been indicated or is ON at step 204. This step can be implemented in a number of ways. For example, the apparatus of FIG. 1 may include a switch which would selectively activate the speed threshold circuit. When the switch is OFF, a continuous overspeed signal 114 would be provided to the AND gate 112 so that the unit would always be enabled to operate whenever a radar detect signal was generated by processor 106 via line 108. By providing a preset speed threshold, the operator has indicated a maximum speed above which an alarm indication should be provided if radar is detected.

If no preset speed threshold has been indicated or the threshold is not ON, the logic proceeds to step 206 to determine whether or not a radar signal has been detected. If a radar signal has been detected, the logic proceeds to step 208 to energize the alarm. If no radar signal is detected or the alarm has been energized, the logic then proceeds back to step 204 to again determine whether or not the preset speed threshold is ON. Those skilled in the art will recognize that timers and delays may be used between these steps to implement this logic in a particular manner. For example, one way of implementing this logic is to program memory 128 to have a zero maximum speed signal unless otherwise programmed by the operator via input device 130. In this case, if no maximum is specified, the comparator would always be providing an overspeed signal 114 since any speed of the vehicle would be equal to or greater than zero.

In the event that the logic determines at step 204 that the speed threshold is ON, the logic then proceeds to step 210. For example, the speed threshold would be ON if the operator had indicated a maximum speed via input device 130. Alternatively, the preset speed threshold would be ON if the speed threshold circuit had been placed in the enable position. Step 210 essentially illustrates in logic form the function of comparator 124. If the actual vehicle speed is greater than or equal to the maximum speed or threshold as set by the operator via input device 130 and stored in memory 128, the logic proceeds to step 206 to determine whether a radar signal has been detected. On the other hand, if the actual vehicle speed is less than the threshold or maximum speed set by the operator, the logic proceeds to step 204 to again begin the process to determine whether or not the preset speed threshold has been set to be on.

In summary, the apparatus of FIG. 1 would operate according to the logic of FIG. 2 in the following manner. The apparatus, including the processor 106 and the GPS receiver 102, would always be operating when the unit was turned on. Radar detecting circuits 104 would be looking for various radar signals which may be impinging on the vehicle as the vehicle is being operated. Simultaneously, the GPS receiver 102 would be providing a corresponding GPS speed signal to comparator 124 indicating the actual speed of the vehicle. If the operator had indicated a maximum or threshold speed via input device 130 which maximum was stored in memory 128, the comparator 124 would compare this maximum speed signal to the actual speed of the vehicle as represented by the GPS speed signal. When the actual speed is greater than or equal to the maximum speed, an overspeed signal would be provided by comparator 124 via line 114. If the vehicle never reaches a speed greater than or equal to the maximum speed, an overspeed signal 114 would never be provided to AND gate 112 and the alarm 110 would never be enabled or permitted to operate.

During periods when the operator operates the vehicle at a speed greater than the maximum speed, an overspeed signal would be provided via line 114 to AND gate 112 essentially placing the AND gate in an enabled state. During the enabled state, if any of the detecting circuits 104 detects radar impinging on the vehicle, processor 106 would process such signals and provide a radar detect signal via line 108 in the event that the processor 106 determines that an alarm should be indicated. The combination of the radar detect signal 108 and overspeed signal via line 114 provided to the AND gate would energize the alarm 110 to provide an alarm indication. If the operator does not indicate a maximum speed via input device 130 so that the memory 128 essentially has stored in it a zero maximum speed, comparator 124 would continuously output an overspeed signal 114 which would continuously enable AND gate 112. As a result, the apparatus would function as a standard radar detector and would provide an alarm indication whenever any of the radar detecting circuits 104 detected a radar signal which according to processor 106 required a radar detect signal to be provided via line 108.

FIG. 3 illustrates in block diagram form another preferred embodiment of the apparatus according to the invention in which a processor for a radar detector is modified by additional circuitry and/or software to operate in accordance with the logic of FIG. 2 described above. As with the embodiment of FIG. 1, the FIG. 3 embodiment includes one or more radar detecting circuits 302, one for each band for sensing radar beacons impinging on the vehicle. When any one or more of these circuits receives a radar signal, a signal is provided to a processor 304 which determines whether or not to actuate an alarm 306 to provide an alarm indication. As with the FIG. 1 embodiment, this alarm may be visible, audible or some other type of indication which will get the operator's attention.

Preferably, the processor includes either a built-in or add-on memory 308 which receives information from an input device 310. This memory 308 and input device 310 correspond to the memory 128 and input device 130 of FIG. 1. The purpose of the memory and input device is to indicate to the processor the threshold or maximum speed above which the alarm 306 should be activated if a radar signal is detected. In addition, the processor 304 has an input for receiving a speed signal 312. This speed signal may be provided by a GPS receiver such as illustrated in FIG. 1. Alternatively, the speed signal may be a signal which is available from the electronics of the vehicle itself such as a tachometer signal or speedometer signal which would indicate vehicle speed. Alternatively, the vehicle could be equipped with a speed sensing device which separately determines the speed of the vehicle and provides a speed signal to the processor 304.

It is contemplated that the input device 310 may allow the operator to operate the apparatus in two modes of operation. In a first mode, the processor 304 would be operable in situations where no maximum acceptable vehicle speed has been indicated by the operator via the input device 310. In this first mode, the alarm 306 would be responsive to only the radar detecting circuits 302 which would be providing detect signals to the processor 304. In this first mode, an alarm indication would be provided by energizing alarm 306 whenever a radar signal is detected by any one or more of the radar detecting circuits 302 and the processor determines that such detected signals fall within the parameters of a signal which should be brought to the operator's attention. Essentially, the first mode corresponds to the standard operating mode of a standard radar detector. Alternatively, the processor 304 would have a second mode of operation which would be operable when the operator has used input device 310 to indicate a maximum acceptable vehicle speed which would be stored in memory 308. In the second mode, the alarm would be responsive to both the radar detecting circuits 302 and the speed signal 312 and provide an alarm indication by energizing the alarm 306 when both the signals from the radar detecting circuits indicate a detected radar signal and the speed signal corresponds to a vehicle speed equal to or greater than the indicated maximum vehicle speed stored in memory 308.

In view of the above, it will be seen that the several objects of the invention are achieved and other advantageous results attained.

As various changes could be made in the above products and methodswithout departing from the scope of the invention, it is intended that all matter contained in the above description and shown in the accompanying drawings shall be interpreted as illustrative and not in a limiting sense.

What is claimed is:

1. An apparatus for use on a vehicle comprising:

a radar detecting circuit adapted to be on the vehicle for detecting a radar signal originating from a radar source remote from the vehicle and for selectively providing a radar detect signal in response to detecting the radar signal;

a global positioning system (GPS) receiver adapted to be on the vehicle for determining a speed of the vehicle and for providing a GPS speed signal representative of the vehicle speed; and an alarm responsive to both the radar detect signal and the GPS speed signal for providing an alarm indication in the event that the GPS speed signal indicates an unacceptable vehicle speed and the radar detect signal indicates that a radar signal has been detected.

2. The apparatus of claim 1 further comprising:

a speed threshold circuit responsive to operator input for indicating a maximum acceptable vehicle speed, said speed threshold circuit associated with the GPS receiver and providing an overspeed signal when the GPS speed signal indicates a vehicle speed which equals or exceeds the maximum acceptable vehicle speed; and wherein the alarm is responsive to both the speed threshold circuit and the radar detecting circuit to provide the alarm indication when both:
  (1) the radar detecting circuit provides a radar detect signal indicating that a radar signal originating from a radar source remote from the vehicle has been detected by the radar detecting circuit, and
  (2) the speed threshold circuit provides an overspeed signal indicating that the vehicle speed as represented by the GPS speed signal equals or exceeds the maximum acceptable vehicle speed.

3. The apparatus of claim 2 wherein the speed threshold circuit comprises:

an input device responsive to operator input;

a memory responsive to the input device for storing the maximum acceptable vehicle speed as indicated by the operator via the input device; and a comparator for comparing the maximum acceptable vehicle speed stored in the memory to the vehicle speed as indicated by the GPS speed signal, said comparator providing the overspeed signal when the vehicle speed equals or exceeds the maximum acceptable vehicle speed.

4. The apparatus of claim 3 wherein the input device comprises a keypad.

5. The apparatus of claim 3 wherein the input device comprises a voice responsive module.

6. The apparatus of claim 3 further comprising an AND gate having a first input receiving a signal corresponding to the radar detect signal and a second input receiving a signal corresponding to the GPS speed signal and having an output providing the alarm indication.

7. The apparatus of claim 6 further comprising a message decoder for decoding the GPS speed signal and a converter for converting the decoded signal.

8. The apparatus of claim 1 further comprising an AND gate having a first input receiving a signal corresponding to the radar detect signal and a second input receiving a signal corresponding to the GPS speed signal and having an output providing the alarm indication.

9. The apparatus of claim 1 further comprising an input device responsive to operator input for indicating the maximum acceptable vehicle speed and wherein the apparatus has:

a first mode operable when no maximum acceptable vehicle speed has been indicated by the operator via the input device, said alarm in said first mode being responsive to the detect signal and providing an alarm indication when a radar detect signal is present; and a second mode operable when a maximum acceptable vehicle speed has been indicated by the operator via the input device, said alarm in said second mode being responsive to both the radar detector and the speed signal and providing an alarm indication when both the radar detect signal indicates that a radar signal from the remote radar source has been detected and the speed signal corresponds to a vehicle speed equal to or greater than the indicated maximum acceptable vehicle speed.

10. An apparatus for use on a vehicle and for use with a speed signal representative of the speed of the vehicle, said apparatus comprising:

a radar detector adapted to be on the vehicle for detecting a radar signal originating from a radar source remote from the vehicle and for selectively providing a radar detect signal in response to detecting the radar signal;

an alarm for providing an alarm indication when energized; and a circuit connected to the alarm and receiving the radar detect signal and the speed signal, said circuit selectively energizing the alarm in response to both the radar detect signal and the speed signal in the event that the speed signal indicates an unacceptable vehicle speed and the radar detect signal indicates that a radar signal has been detected.

11. The apparatus of claim 10 further comprising:

an input device responsive to operator input;

a memory responsive to the input device for storing the maximum acceptable vehicle speed as indicated by the operator via the input device; and wherein the processor compares the maximum acceptable vehicle speed stored in the memory to the vehicle speed as indicated by the GPS speed signal, said comparator providing the overspeed signal when the vehicle speed equals or exceeds the maximum acceptable vehicle speed.

12. The apparatus of claim 10 further comprising a GPS receiver on the vehicle for determining a speed of the vehicle and providing the speed signal.

13. The apparatus of claim 12 further comprising a message decoder for decoding the speed signal and a converter for converting the decoded signal.

14. The apparatus of claim 10 wherein the circuit includes a processor and further comprising an input device connected to the processor and responsive to operator input for indicating a maximum acceptable vehicle speed and wherein the processor energizes the alarm when both the radar detect signal indicates detected radar and the speed signal corresponds to a vehicle speed equal to or greater than the maximum acceptable vehicle speed.

15. The apparatus of claim 14 wherein the processor has:

a first mode operable when no maximum acceptable vehicle speed has been indicated by the operator via the input device, said processor in said first mode being responsive to the detect signal and providing an alarm indication when a radar detect signal is present; and a second mode operable when a maximum acceptable vehicle speed has been indicated by the operator via the input device, said processor in said second mode being responsive to both the radar detector and the speed signal and providing an alarm indication when both the radar detect signal indicates that a radar signal from the remote radar source has been detected and the speed signal corresponds to a vehicle speed equal to or greater than the indicated maximum acceptable vehicle speed.

16. An apparatus for providing an alarm indication for a vehicle comprising:

a detector detecting a radar signal originating from a radar source remote from the vehicle and impinging on the vehicle;

an input device defining a maximum acceptable speed of the vehicle;

a speed circuit determining an actual speed of the vehicle; and an actuating circuit selectively energizing an alarm to provide the alarm indication when the radar signal is detected by the detector and the speed circuit determines that the actual speed of the vehicle equals or exceeds the maximum acceptable speed of the vehicle as defined by the input device.

17. The apparatus of claim 16 wherein the input device responsive to operator input; and further comprising:

a memory responsive to the input device for storing the maximum acceptable vehicle speed as indicated by the operator via the input device; and wherein the processor compares the maximum acceptable vehicle speed stored in the memory to the vehicle speed as indicated by the GPS speed signal, said comparator providing the overspeed signal when the vehicle speed equals or exceeds the maximum acceptable vehicle speed.

18. The apparatus of claim 16 further comprising a GPS receiver on the vehicle for determining a speed of the vehicle and providing the speed signal.

19. The apparatus of claim 18 further comprising a message decoder for decoding the speed signal and a converter for converting the decoded signal.

20. The apparatus of claim 16 wherein the circuit includes a processor and further comprising an input device connected to the processor and responsive to operator input for indicating a maximum acceptable vehicle speed and wherein the processor energizes the alarm when both the radar detect signal indicates detected radar and the speed signal corresponds to a vehicle speed equal to or greater than the maximum acceptable vehicle speed.

21. The apparatus of claim 20 wherein the processor has:

a first mode operable when no maximum acceptable vehicle speed has been indicated by the operator via the input device, said processor in said first mode being responsive to the detect signal and providing an alarm indication when a radar detect signal is present; and a second mode operable when a maximum acceptable vehicle speed has been indicated by the operator via the input device, said processor in said second mode being responsive to both the radar detector and the speed signal and providing an alarm indication when both the radar detect signal indicates that a radar signal from the remote radar source has been detected and the speed signal corresponds to a vehicle speed equal to or greater than the indicated maximum acceptable vehicle speed.

22. A method of providing an alarm indication for a vehicle comprising the steps of:

detecting a radar signal originating from a radar source remote from the vehicle and impinging on the vehicle;

defining a maximum acceptable speed of the vehicle;

determining a speed of the vehicle; and actuating an alarm to provide the alarm indication when a radar signal is detected and the determined speed of the vehicle equals or exceeds the maximum acceptable speed of the vehicle.

* * * * *